United States Patent
Liu et al.

(10) Patent No.: US 8,533,461 B2
(45) Date of Patent: Sep. 10, 2013

(54) WIRELESS LOCAL AREA NETWORK TERMINAL PRE-AUTHENTICATION METHOD AND WIRELESS LOCAL AREA NETWORK SYSTEM

(75) Inventors: Jiabing Liu, Shenzhen (CN); Yuanqing Shi, Shenzhen (CN); Jiehui Liang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 13/257,749

(22) PCT Filed: Aug. 20, 2009

(86) PCT No.: PCT/CN2009/073377
§ 371 (c)(1),
(2), (4) Date: Sep. 20, 2011

(87) PCT Pub. No.: WO2010/115326
PCT Pub. Date: Oct. 14, 2010

(65) Prior Publication Data
US 2012/0017088 A1   Jan. 19, 2012

(30) Foreign Application Priority Data
Apr. 8, 2009   (CN) .......................... 2009 1 0133725

(51) Int. Cl.
*H04L 29/06* (2006.01)

(52) U.S. Cl.
USPC ........... 713/156; 713/170; 713/171; 380/272; 380/283; 726/10

(58) Field of Classification Search
None
See application file for complete search history.

(56) References Cited

U.S. PATENT DOCUMENTS

| | | | | |
|---|---|---|---|---|
| 8,175,058 | B2* | 5/2012 | Oba et al. ....................... | 370/331 |
| 8,190,124 | B2* | 5/2012 | Frank et al. .................... | 455/411 |
| 8,218,512 | B2* | 7/2012 | Yaqub ........................... | 370/338 |
| 2004/0098586 | A1* | 5/2004 | Rebo et al. ...................... | 713/169 |
| 2007/0003062 | A1* | 1/2007 | Mizikovsky et al. .......... | 380/270 |
| 2008/0051060 | A1* | 2/2008 | Lee et al. ....................... | 455/411 |

FOREIGN PATENT DOCUMENTS

| | | |
|---|---|---|
| CN | 1602109 A | 3/2005 |
| CN | 101155396 A | 4/2008 |
| WO | 03100990 A2 | 12/2003 |
| WO | 2005109771 | 11/2005 |
| WO | 2006044251 A2 | 4/2006 |

OTHER PUBLICATIONS

Pack et al., Pre-Authenticated Fast Handoff in a Public Wireless LAN Based on IEEE 802.1x Model, PWC Proceedings, 2002.*

(Continued)

*Primary Examiner* — Minh Dinh
(74) *Attorney, Agent, or Firm* — Brooks Kushman P.C.

(57) ABSTRACT

A method for pre-authenticating a wireless local area network terminal and a wireless local area network system. The pre-authentication method includes after a current access point (AP) which has set up security association with a station (STA) receiving a pre-authentication start packet sent by the STA, the current AP interacting with a destination AP to verify certificates of the current AP and the destination AP for each other. If a certificate of the destination AP is verified to be valid, the current AP sending key information of the security association set up with the STA by the current AP to the destination AP, and the destination AP saving the key information, the key information including a basic key generated by negotiation between the STA and the current AP.

5 Claims, 3 Drawing Sheets

(56) References Cited

OTHER PUBLICATIONS

Kassab et al., Fast Pre-Authentication Based on Proactive Key Distribution for 802.11 Infrastructure Networks, ACM, 2005.*
Mishra et al., Proactive Key Distribution using Neighbor Graphs, IEEE, 2004.*
Schneier, Applied Cryptography, John Wiley & Sons, 1996, pp. 576-577.*
International Preliminary Report on Patentability for PCT/CN2009/073377 dated Oct. 11, 2011.
International Search Report for PCT/CN2009/073377, English translation attached to original both completed by the Chinese Patent Office on Dec. 18, 2009, 4 Pages all together.
Jahan Hassan et al., Trust-Based Fast Authentication for Multiowner Wireless Networks, IEEE Transactions on Mobile Computing, vol. 7, No. 2, Feb. 2008, pp. 247-261.

* cited by examiner

| FLAG | USKID | ADDID | Replay timer | Message authentication code |

WIRELESS LOCAL AREA NETWORK TERMINAL PRE-AUTHENTICATION METHOD AND WIRELESS LOCAL AREA NETWORK SYSTEM

CROSS-REFERENCE TO RELATED APPLICATION

This application is the U.S. national phase of PCT Application. No. PCT/CN2009/073377 filed Aug. 20, 2009 which claims priority to Chinese Application No. 200910133725.7 filed Apr. 8, 2009, the disclosures of which are incorporated in their entirety by reference herein.

TECHNICAL FIELD

The present invention relates to the wireless local area network (WLAN) field, and particularly, to a method for pre-authenticating a wireless local network terminal which supports the WLAN Authentication and Privacy Infrastructure (WAPI) and a wireless local area network system.

BACKGROUND OF THE RELATED ART

At present, the wireless network security mainly adopts the security mechanism in the wireless local area network standard (IEEE 802.11) constituted by the Institute of Electrical and Electronics Engineers (IEEE). This mechanism adopts the Wired Equivalent Privacy (WEP), and this mechanism has been widely proved that it does not have the security equivalent to the wired network, and brings huge hidden danger in security to the wireless local area network.

In this situation, China has put forward a wireless local area network national standard GB15629.11 in May, 2003, which introduced a brand new security mechanism, namely the Wireless Local Area Network Authentication and Privacy Infrastructure (WAPI) to enhance the security of the wireless local area network, and has published an improved national standard (GB15629.11-2003/XG1-2006) in 2006.

The WAPI is comprised of the WLAN Authentication Infrastructure (WAI) and the WLAN Privacy Infrastructure (WPI), wherein the WAI adopts the elliptic-curve-based public key certificate system. The wireless station (STA) and access point (AP) carry out bidirectional identity authentication (certificate authentication) through the Authentication Server (AS). For the security of the transmission data, the WPI adopts the symmetric cryptographic algorithm SMS4 provided by the State Commercial Secret code Regulatory Commission Office in China for encryption and decryption to ensure the security of the data transmission.

The WAPI mechanism mainly relates to following three entities: a wireless station (STA), a wireless access point (AP) and an authentication server. To set up association with an AP and securely transmit data, STA should complete two parts of works: one is to complete the certificate authentication process, and generate a basic key in this process; and the other is to negotiate keys based on the basic key, including unicast key negotiation and the multicast key notification. As shown in FIG. 1, the following steps are comprised:

101: the AP sends an authentication activation packet to the STA to start the certificate authentication process;

The authentication activation packet includes fields such as: an AP certificate, ECDH (Elliptic Curve Diffie-Hellman) parameters and so on.

102: after receiving the authentication activation packet, the STA saves the AP certificate which is used to verify the signature of the AP in the subsequent operations, and generates a temporary private key sx and a temporary public key px which are used in the ECDH exchange.

103: the STA generates an access authentication request packet, and sends the access authentication request packet to the AP;

The access authentication request packet includes fields such as a temporary public key px, the STA certificate and so on, and a signature value signed on above fields by the STA.

104: after receiving the access authentication request packet, the AP verifies the signature of the STA (using the public key included in the STA certificate), and if the verification is unsuccessful, this access authentication request packet is discarded; or else the AP generates a certificate authentication request packet, and sends the certificate authentication request packet to the authentication server;

The certificate authentication request packet includes: the STA certificate and the AP certificate.

105: after receiving the certificate authentication request packet, the authentication server verifies the STA certificate and the AP certificate;

106: the authentication server constructs an certificate authentication response packet, which includes the verification results of the STA certificate and the AP certificate and attaches a signature of the authentication server, and sends the certificate authentication response packet to the AP;

107: the AP verifies the signature of the authentication server, and after the verification is successful, further verifies the verification result of the STA certificate verified by the authentication server, and after the verification is successful, the following operations are carried out:

107a: a temporary private key sy and a temporary public key py used for ECDH exchange are generated;

107b: ECDH calculation is carried out using the temporary public key px sent by the STA and the temporary private key sy generated locally to generate a basic key (BK).

108: the AP sends an access authentication response packet to the STA;

The access authentication response packet includes: a temporary public key py, a certificate verification result, a signature of the authentication server, and a signature signed on above fields by the AP.

109: after receiving the access authentication response packet, the STA verifies the signature of the AP, the signature of the authentication server, and the certificate verification result, and if both of the signatures of the AP and the authentication server are correct, and the authentication server verifies the AP certificate successfully, the STA carries out the ECDH calculation using the temporary public key py and temporary private key sx to generate the BK.

It should be noted that according the principal of the ECDH, the BKs generated by the STA and the AP are the same.

Through above processes, the STA and AP complete the bidirectional identity authentication (namely the certificate authentication), and set up the Base Key Security Association (BKSA). The BKSA includes parameters such as a BK, and a base key identifier (BKID) and so on.

110: the AP sends a unicast key negotiation request packet to the STA;

The unicast key negotiation request packet includes parameters such as the BKID, ADDID, and $N_1$ and so on, wherein The BKID is the identifier of the BK obtained from the previous negotiation of the AP and STA;

ADDID is comprised of the Media Access Control (MAC) addresses of the AP and STA;

$N_1$ is a random number generated by the AP.

111: after receiving the unicast key negotiation request packet, the STA generates a random number $N_2$, and then calculates:

Key=KD-HMAC-SHA256(BK, ADDID∥$N_1$∥$N_2$∥String);

wherein

BK is the base key identified by the above BKID; KD-HMAC-SHA256 is the Hashed Message Authentication Code (HMAC) algorithm based on the SHA256 algorithm, namely a HASH algorithm with a key; String is a preset character string, which is "pairwise key expansion for unicast and additional keys and nonce" in the current standard; "∥" denotes a string concatenation operation, and "ADDID∥$N_1$∥$N_2$∥String" is the character parameter used by the KD-HMAC-SHA256 algorithm.

After calculating to obtain the Key, the STA extracts 64 bytes therein as the unicast session key (USK), including: 16 bytes unicast encryption key, 16 bytes unicast integrity check key, 16 bytes message authentication key, and 16 bytes key encryption key.

112: the STA sends a unicast key negotiation response packet to the AP;

The unicast key negotiation response packet includes parameters such as: the BKID, random number $N_2$ and so on.

113: after receiving the unicast key negotiation response packet, the AP makes the following calculates:

Key=KD-HMAC-SHA256(BK, ADDID∥$N_1$∥$N_2$∥String), and extracts the USK therein.

114: the AP sends a unicast key negotiation confirmation packet to the STA;

So far, the AP and STA complete the unicast session key negotiation flow, and set up the unicast session key security association (USKSA).

115: the AP sends a multicast key notification packet to the STA;

The multicast key notification packet includes fields such as: the ADDID, key data, message authentication code and so on.

The key data field is the cryptograph generated by encrypting the notification master key by the AP using the key encryption key and the algorithm chosen in the negotiation of the AP and the STA. The notification master key is a 16 bytes random number generated by the AP.

The message authentication code is data resulting from calculation on all the protocol data fields before this field by the AP using the message authentication key and the HMAC-SHA256 algorithm.

116: after receiving the multicast key notification packet, the STA verifies the message authentication code, and after the verification is passed, the STA decrypts key data to obtain the notification master key, and expands the notification master key using the KD-HMAC-SHA256 algorithm to obtain the multicast key.

117: the STA sends the multicast key response packet to the AP to complete the multicast key notification process.

In the wireless local area network, there may be a plurality of APs existing. If the STA wants to handoff from the current AP to the destination AP, the STA requires carrying out the certificate authentication process and the key negotiation process with the destination AP over again. These processes will spend a lot of time, resulting in the handoff delay, and even breaking off the communication. Therefore, the WAPI puts forward the pre-authentication method.

In the WAPI mechanism, if the destination AP supports pre-authentication, after completing unicast session key negotiation with the current associated AP and installing the key, the STA can start the pre-authentication process. The authentication unit of the STA sends a pre-authentication start packet to active the pre-authentication process. The destination address (DA) of this packet is the Basic Service Set ID (BSSID) of the destination AP, and the source address (RA) is the BSSID of the current associated AP. The destination AP should use own BSSID as the Media Access Control (MAC) of the AP authentication unit. The current associated AP bridges the pre-authentication packet sent by the STA to the Distribution System (DS). The destination AP receiving the pre-authentication packet through the DS starts the certificate authentication process with the corresponding STA. If the certificate authentication process of the WAI is successful, the result of the pre-authentication is the Base Key Security Association (BKSA). After associating with the destination AP which completes the pre-authentication, the STA can use the BKSA to carry out the unicast key negotiation and the multicast key notification processes.

It can be seen from above description that the existing pre-authentication method in the WAPI is that the STA and AP carry out the identity authentication and key negotiation for each other in advance to reduce the handoff delay.

However, the current pre-authentication method has the following drawbacks: when the STA and the destination AP carry out the pre-authentication, the whole certificate authentication process and key negotiation process are still required to be carried out, and the pre-authentication process is rather complex; and when the STA requires carrying out pre-authentication with a plurality of APs, more time is spent, and more bandwidth resources are occupied, and the handoff delay of the STA is increased indirectly.

SUMMARY OF THE INVENTION

The technical problem to be solved in the present invention is to overcome the drawbacks in the prior art, and to provide a pre-authentication method and a wireless local area network system, which can quickly complete the pre-authentication of the wireless local area network terminal and occupies less bandwidth resources.

In order to solve the above problem, the present invention provides a method for pre-authenticating a wireless local area network terminal, comprising:

after a current access point (AP) which has set up security association with a station (STA) receiving a pre-authentication start packet sent by the STA, the current AP interacting with a destination AP to verify certificates of the current AP and the destination AP for each other; and if a certificate of the destination AP is verified to be valid, the current AP sending key information of the security association set up with the STA by the current AP to the destination AP, and the destination AP saving the key information;

the key information including a basic key generated by negotiation between the STA and the current AP.

In addition, the current AP and destination AP adopt the following way to verify certificates thereof for each other:

the current AP sends a pre-authentication initiation packet to the destination AP, and the pre-authentication initiation packet includes a certificate of the current AP and a signature of the current AP;

after receiving the pre-authentication initiation packet, the destination AP verifies the signature of the current AP, and after the verification is successful, the destination AP sends a certificate authentication request packet to an authentication server, and the certificate authentication request packet includes the certificate of the current AP, the certificate of the destination AP and a signature of the destination AP; and after receiving the certificate authentication request packet, the authentication server verifies the signature of the destination AP, and after the signature is verified successfully, the authentication server verifies the certificates of the current AP and the destination AP, and sending a certificate authentication response packet including certificate verification results and a signature of the authentication server to the destination AP and the current AP.

In addition, the key information further includes a unicast session key generated by negotiation between the STA and the current AP;

after receiving the key information, the destination AP also uses the unicast session key to negotiate with the STA to generate a multicast key.

In addition, if the certificate of the destination AP is verified to be invalid, the current AP releases a link relationship of the current AP and the destination AP, and informs the STA that the destination AP is illegal.

The present invention also provides a wireless local area network system, and the system comprises a STA, a current AP which has set up security association with the STA, and a destination AP which supports a pre-authentication function, wherein the current AP is used for, after receiving a pre-authentication start packet sent by the STA, interacting with the destination AP to verify certificates of the current AP and the destination AP for each other; and if the certificate of the destination AP is verified to be valid, the current AP is further used for sending key information of the security association set up with the STA by the current AP to the destination AP; the destination AP saves the key information;

the key information includes a basic key generated by negotiation between the STA and the current AP.

In addition, the system further comprises an authentication server; the current AP and destination AP adopt the following way to verify certificates of the current AP and the destination AP for each other:

the current AP sending a pre-authentication initiation packet to the destination AP, the pre-authentication initiation packet including a certificate of the current AP and a signature of the current AP;

after receiving the pre-authentication initiation packet, the destination AP verifies the signature of the current AP, and after the verification is successful, the destination AP sends a certificate authentication request packet to the authentication server, the certificate authentication request packet including the certificate of the current AP, the certificate of the destination AP and a signature of the destination AP; and after receiving the certificate authentication request packet, the authentication server verifies the signature of the destination AP, and after the verification is successful, the authentication server verifies the certificates of the current AP and the destination AP, and sends a certificate authentication response packet including certificate verification results and a signature of the authentication server to the destination AP and the current AP.

In addition, the key information further includes a unicast session key generated by negotiation between the STA and the current AP;

the destination AP is further used for, after receiving the key information, using the unicast session key to negotiate with the STA to generate a multicast key.

As a conclusion, the present invention is based on the WAPI three-element security frame idea, makes use of the security association that has been set up to carry out the identity authentication (certificate verification) on the untrusted AP. And after the identity authentication is completed, the current AP sends the key information (mainly a base key) to the destination AP. Through this optimized pre-authentication method, in a precondition of not reducing the system security performance, the interaction processes between each network element are reduced, and the aim of quickly pre-authenticating wireless local area network terminal is achieved.

PREFERRED EMBODIMENTS OF THE PRESENT INVENTION

The core idea of the present invention is: after an AP which has set up a security association with a STA (called the current AP for short) receives a pre-authentication start packet sent by the STA, the current AP verifying the destination AP certificate through the authentication server, and after the certificate is verified successfully, the current AP sending the key information of the security association set up with the STA to the destination AP; and the destination AP saving said key information, thereby completing the pre-authentication.

Below it will describe the present invention with reference to the figures and examples in detail.

Figure 1:
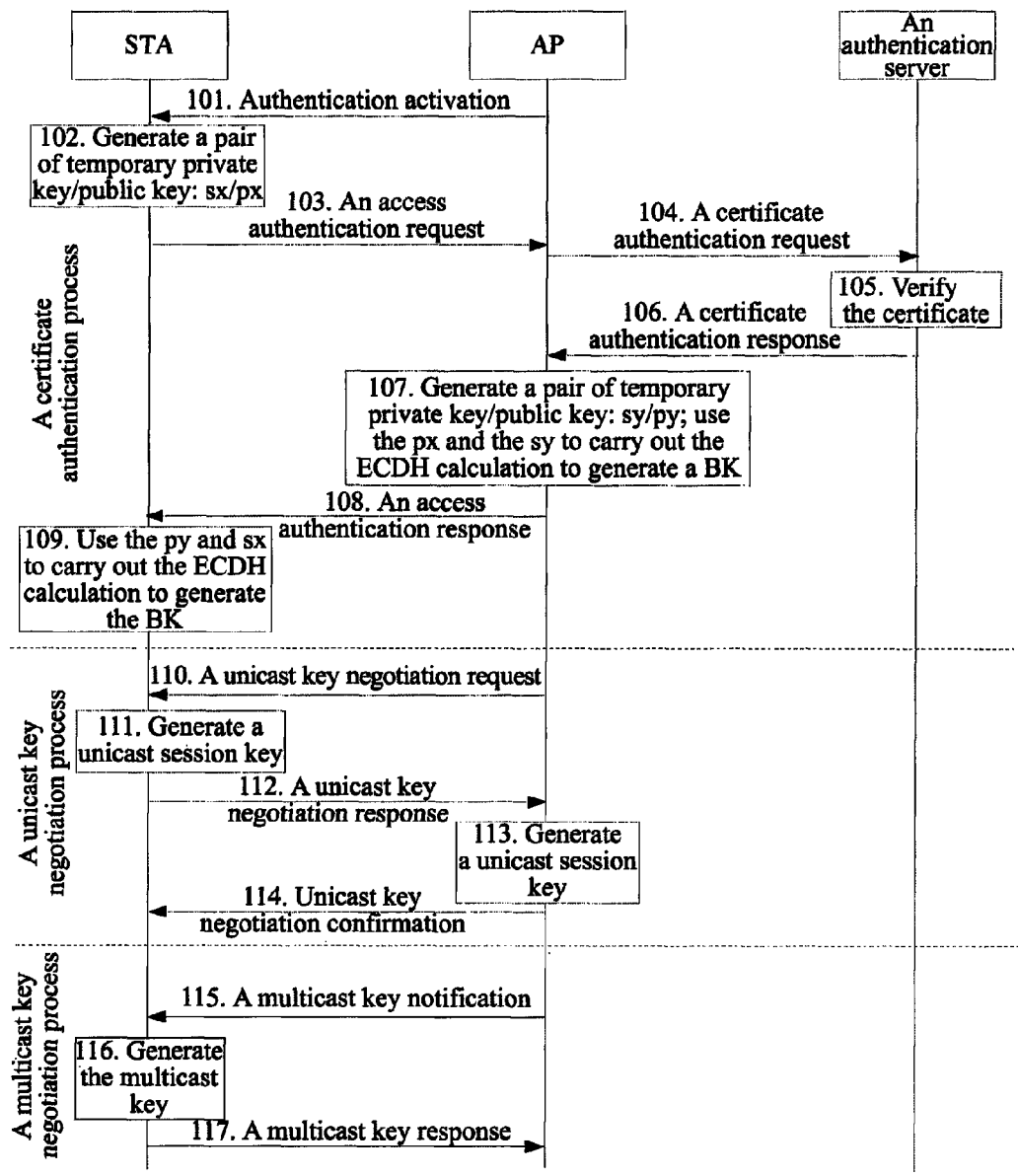
FIG. 1 is a flow chart of the certificate authentication process and the key negotiation process in the prior art.
Figures 2, 3:
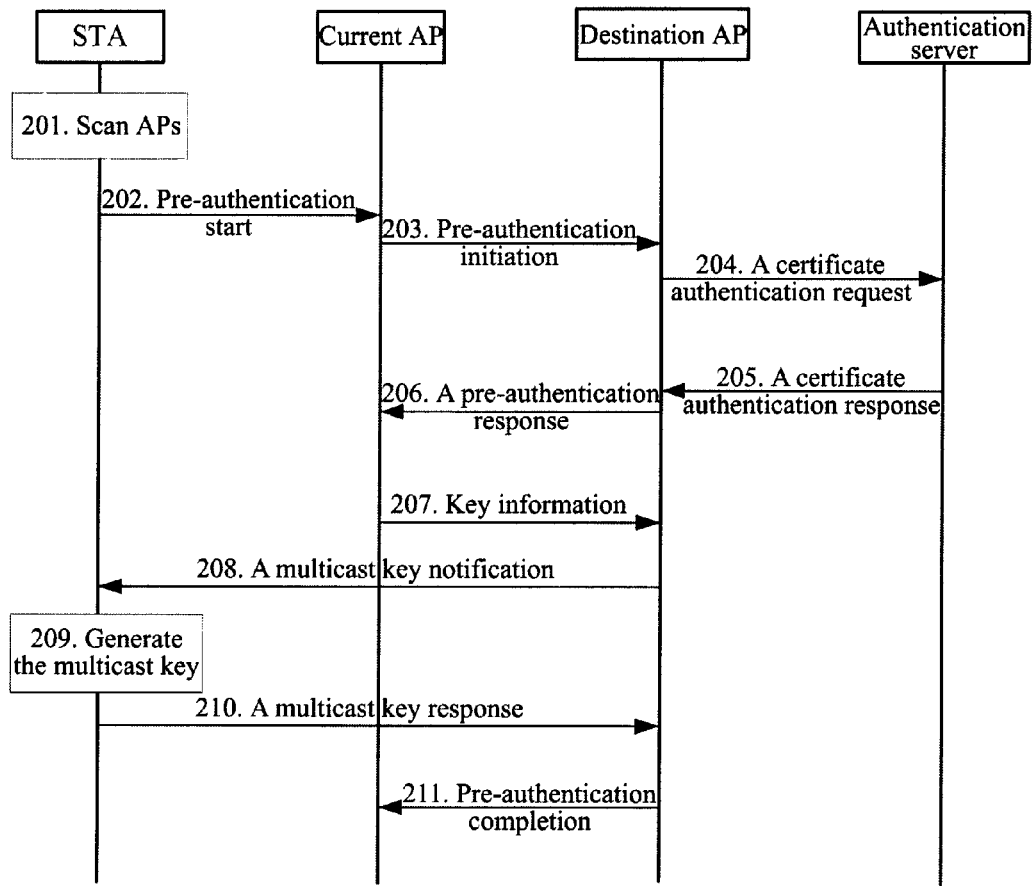
FIG. 2 is a flow chart of the method for pre-authenticating the wireless local area network terminal according to an example of the present invention.
FIG. 3 is a schematic diagram of the format of the pre-authentication packet.

FIG. 2 is a flow chart of the method for pre-authenticating a wireless local area network terminal according to an example of the present invention, including the following steps:

201: after setting up the security association with the current AP, the STA starts to scan APs actively or passively if the signal intensity of the current AP is lower than a preset threshold when the STA moves in the Extended Service Set (ESS).

202: the STA judges whether the scanned APs support pre-authentication according to the WAPI information element field in the Beacon frame or the Probe Response frame, and establishes an AP priority list according to the signal intensity of the APs which support the pre-authentication; takes an AP with the highest priority as a destination AP, and then sends a pre-authentication start packet to the current AP.

The pre-authentication packet adopts the format defined in the WAPI protocol, as shown in FIG. 3, and the particular content can see the GB15629.11-2003/XG1-2006, wherein the length of the ADDID field is 12 bytes, and the value of this field is comprised of the MAC address of the initiator STA and the MAC address of the destination AP.

203: after receiving the pre-authentication start packet, the current AP sends a pre-authentication initiation packet to the destination AP through the Distributed System (DS) to active the certificate authentication process.

The pre-authentication initiation packet includes information such as: the current AP certificate, the MAC addresses of the STA and the current AP, and the signature of the current AP and so on.

204: after receiving the pre-authentication initiation packet, the destination AP verifies the signature of the current AP, and after the verification is successful, the destination AP sends a certificate authentication request packet to the authentication server to carry out the identity authentication.

The certificate authentication request packet includes information such as: the MAC address of the destination AP, the MAC address of the current AP, the destination AP certificate and the current AP certificate and so on.

205: after receiving the certificate authentication request packet, the authentication server verifies the destination AP certificate and the current AP certificate, and includes the verification results of the destination AP certificate and the current AP certificate into a certificate authentication response packet, and attaches a signature of the authentication server, and then sends the certificate authentication response packet to the destination AP.

206: after receiving the certificate authentication response packet, the destination AP verifies the signature of the authentication server, and if the signature is wrong, discards this certificate authentication response packet, or checks the verification result of the certificate of the current AP, and if the current AP certificate is valid, constructs a pre-authentication response packet, and sends the pre-authentication response packet to the current AP.

The pre-authentication response packet includes information such as: the signature of the destination AP, the signature of the authentication server, and the verification result of the destination AP certificate and so on.

207: after receiving the pre-authentication response packet, the current AP verifies whether the signature of the destination AP and the signature of the authentication server are correct, and if any one of the signatures is wrong, discards this packet; or else checks whether the destination AP certificate is valid according to the verification result of the destination AP certificate, and if it is invalid, releases the link relationship between two APs and informs the STA that the destination AP is illegal; and if all of above checks are passed, the current AP sends the key information of the security association set up with the STA to the destination AP through DS;

Above key information includes BKSA parameters such as: a base key identifier (BKID), base key (BK) and so on; besides, the key information can further include USKSA parameters such as the unicast session key identifier (USKID), unicast session key (USK) and so on.

208: after receiving the above key information, the destination AP uses the key encryption key (KEK) in the unicast session key to encrypt the notification master key (NMK) to generate the key data, and uses the message authentication key to calculate the message authentication code, and includes the key data and message authentication code into a multicast key notification packet and sends the multicast key notification packet to the STA.

209: after receiving the multicast key notification packet, the STA checks the message authentication code, and after the check is passed, decrypts the key data to obtain the notification master key, and uses the KD-HMAC-SHA256 algorithm to expand the notification master key, and generates the multicast key (which includes 16 bytes multicast encryption key and 16 bytes integrity check key).

210: the STA sends a multicast key response packet to the destination AP to complete the multicast key notification process.

211: the destination AP sends a pre-authentication completion packet to the current AP through the DS to inform the current AP that the pre-authentication has been completed.

According to the basic principle of the present invention, above examples can also have a plurality of transformations, such as:

(1) in the step 207, the current AP can only send the BKSA parameters to the destination AP, and the destination AP uses the BK in the BKSA to negotiate with the STA to generate a new USK.

Certainly, the negotiation of the unicast session key can also be carried out after STA is switched to be the destination AP.

(2) the destination AP and the STA may not carry out the multicast key negotiation during the pre-authentication process until the STA is switched to be the destination AP.

(3) in the step 204, after receiving the pre-authentication initiation packet, the destination AP can directly sends a pre-authentication response packet including the destination AP certificate to the current AP, and the current AP sends a certificate authentication request packet including the current AP certificate and the destination AP certificate to the authentication server, and the authentication server verifies the current AP certificate and the destination AP certificate, and sends the verification result together with the key information to the destination AP.

(4) if both the destination AP and the current AP have the public key of the authentication server, the destination AP and the current AP can use this public key to verify the certificate of the other party, without sending the certificate to the authentication server. Certainly, in this situation, it cannot verify whether the certificate of the other party is revoked.

Figure 4:
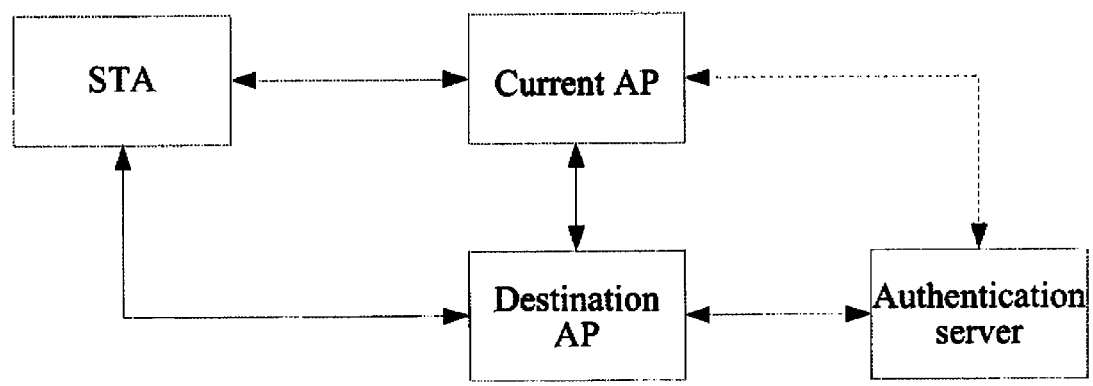
FIG. 4 is structural schematic diagram of the wireless local area network system which can implement the above method of the present invention.

FIG. 4 is structural schematic diagram of the wireless local area network system which can implement the above method of the present invention. As shown in FIG. 4, this system includes: a STA, a current AP which has set up security association with said STA, and a destination AP which supports a pre-authentication function. Wherein:

said current AP is use for, after receiving a pre-authentication start packet sent by said STA, interacting with said destination AP to verify certificates of the two parties for each other;

If the certificate of the destination AP is verified to be valid, said current AP is also used for sending the key information of the security association set up with said STA to said destination AP; said destination AP stores said key information;

Said key information includes a basic key generated by negotiation between the STA and the AP.

The detailed functions and the connection relationships (interactive messaging relationship) of each network element in the system shown in FIG. 4 have been introduced in the description of the flow shown in FIG. 2, and herein it will not be described repeatedly.

INDUSTRIAL APPLICABILITY

The present invention is based on the WAPI three-element security frame idea, makes use of the security association that has been set up to carry out the identity authentication (certificate verification) on the untrusted AP. And after the identity authentication completes, the current AP sends the key information (mainly a base key) to the destination AP. Through this optimized pre-authentication method, in a precondition of not reducing the system security performance, the interaction processes between each network element are reduced, and the aim of quickly pre-authenticating the wireless local area network terminal is achieved.

What is claimed is:

1. A method for pre-authenticating a wireless local area network terminal, comprising:

after a current access point (AP) which has set up security association with a station (STA) receiving a pre-authentication start packet sent by said STA, the current AP interacting with a destination AP to verify certificates of the current AP and the destination AP for each other, wherein said current AP and destination AP adopt the following way to verify certificates thereof for each other:

said current AP sends a pre-authentication initiation packet to said destination AP, and said pre-authentication initiation packet includes a certificate of said current AP and a signature of said current AP;

after receiving said pre-authentication initiation packet, said destination AP verifies the signature of said current AP, and after the verification is successful, the destination AP sends a certificate authentication request packet to an authentication server, and said certificate authentication request packet includes the certificate of said current AP, the certificate of said destination AP and a signature of said destination AP; and after receiving the certificate authentication request packet, said authentication server verifies the signature of said destination AP, and after the signature is verified successfully, the authentication server verifies the certificates of said current AP and said destination AP, and sending a certificate authentication response packet including certificate verification results and a signature of said authentication server to said destination AP and the current AP; and if a certificate of said destination AP is verified to be valid, said current AP sending key information of the security association set up with said STA by said current AP to said destination AP, and said destination AP saving said key information;

wherein said key information includes a basic key generated by negotiation between said STA and said current AP.

2. The method as claimed in claim 1, wherein
said key information further includes a unicast session key generated by negotiation between said STA and said current AP;
after receiving said key information, said destination AP also uses said unicast session key to negotiate with said STA to generate a multicast key.

3. The method as claimed in claim 1, wherein
if the certificate of said destination AP is verified to be invalid, said current AP releases a link relationship of said current AP and said destination AP, and informs said STA that said destination AP is illegal.

4. A wireless local area network system, and said system comprising a STA, an authentication server, a current AP which has set up security association with said STA, and a destination AP which supports a pre-authentication function, wherein said current AP is used for, after receiving a pre-authentication start packet sent by said STA, interacting with said destination AP to verify certificates of the current AP and the destination AP for each other, wherein said current AP and destination AP adopt the following way to verify certificates of the current AP and the destination AP for each other:

said current AP sending a pre-authentication initiation packet to said destination AP, said pre-authentication initiation packet including a certificate of said current AP and a signature of said current AP;

after receiving said pre-authentication initiation packet, said destination AP verifies the signature of said current AP, and after the verification is successful, the destination AP sends a certificate authentication request packet to said authentication server, said certificate authentication request packet including the certificate of said current AP, the certificate of said destination AP and a signature of said destination AP; and after receiving the certificate authentication request packet, said authentication server verifies the signature of said destination AP, and after the verification is successful, the authentication server verifies the certificates of said current AP and said destination AP, and sends a certificate authentication response packet including certificate verification results and a signature of said authentication server to said destination AP and said current AP; and if the certificate of said destination AP is verified to be valid, said current AP is further used for sending key information of the security association set up with said STA by said current AP to said destination AP;
said destination AP saves said key information;
wherein said key information includes a basic key generated by negotiation between said STA and said current AP.

5. The system as claimed in claim 4, wherein
said key information further includes a unicast session key generated by negotiation between said STA and said current AP;
said destination AP is further used for, after receiving said key information, using said unicast session key to negotiate with said STA to generate a multicast key.

* * * * *